US011981018B2

(12) United States Patent
Numata

(10) Patent No.: US 11,981,018 B2
(45) Date of Patent: May 14, 2024

(54) POWER TOOL

(71) Applicant: MAKITA CORPORATION, Anjo (JP)

(72) Inventor: Fumitoshi Numata, Anjo (JP)

(73) Assignee: MAKITA CORPORATION, Anjo (JP)

( * ) Notice: Subject to any disclaimer, the term of this patent is extended or adjusted under 35 U.S.C. 154(b) by 244 days.

(21) Appl. No.: 17/625,832

(22) PCT Filed: Jul. 28, 2020

(86) PCT No.: PCT/JP2020/028951

§ 371 (c)(1),
(2) Date: Jan. 10, 2022

(87) PCT Pub. No.: WO2021/024867

PCT Pub. Date: Feb. 11, 2021

(65) Prior Publication Data

US 2022/0258321 A1 Aug. 18, 2022

(30) Foreign Application Priority Data

Aug. 6, 2019 (JP) ................................ 2019-144455

(51) Int. Cl.

*B25F 5/00* (2006.01)
*B25F 5/02* (2006.01)
*B25D 17/00* (2006.01)

(52) U.S. Cl.

CPC .............. *B25F 5/026* (2013.01); *B25F 5/001* (2013.01); *B25D 17/00* (2013.01); *B25D 2250/221* (2013.01)

(58) Field of Classification Search

CPC ...................................................... B25F 5/026
See application file for complete search history.

(56) References Cited

U.S. PATENT DOCUMENTS

| | | | |
|---|---|---|---|
| 7,628,219 | B2 | 12/2009 | Frauhammer et al. |
| 2013/0141217 | A1 | 6/2013 | Goren et al. |
| 2015/0340921 | A1 | 11/2015 | Suda et al. |

(Continued)

FOREIGN PATENT DOCUMENTS

| | | | |
|---|---|---|---|
| CN | 105313081 | A | 2/2016 |
| JP | 2004-320571 | A | 11/2004 |

(Continued)

OTHER PUBLICATIONS

Jul. 25, 2023 Office Action issued in Japanese Patent Application No. 2019-144455.

(Continued)

*Primary Examiner* — Eyamindae C Jallow
(74) *Attorney, Agent, or Firm* — Oliff PLC

(57) ABSTRACT

A power tool includes an accessory and a reader. The accessory is configured to be attachable to and detachable from the power tool. The accessory includes a passive wireless tag. The reader includes at least one antenna and a reading part. The reading part is electrically connected to the at least one antenna. The reading part is configured to wirelessly communicate with the wireless tag via the at least one antenna and to read information stored in the wireless tag when the accessory is attached to the power tool.

16 Claims, 2 Drawing Sheets

(56) References Cited

U.S. PATENT DOCUMENTS

| | | | |
|---|---|---|---|
| 2017/0185813 A1 | 6/2017 | Maruyama et al. | |
| 2017/0358187 A1* | 12/2017 | Goren | G08B 13/2434 |
| 2018/0272494 A1 | 9/2018 | Schadow et al. | |
| 2021/0060756 A1* | 3/2021 | Turner | H01H 21/54 |
| 2021/0060757 A1* | 3/2021 | Swaminathan | B25F 5/001 |

FOREIGN PATENT DOCUMENTS

| | | |
|---|---|---|
| JP | 2008-071071 A | 3/2008 |
| JP | 2016-048544 A | 4/2016 |
| JP | 2016-095730 A | 5/2016 |
| TW | 201617976 A | 5/2016 |

OTHER PUBLICATIONS

Sep. 24, 2020 Search Report issued in International Patent Application No. PCT/JP2020/028951.

Apr. 12, 2023 Office Action Issued in Chinese Patent Application No. 202080055750.2.

Feb. 8, 2022 International Preliminary Report on Patentability issued in Patent Application No. PCT/JP2020/028951.

Dec. 5, 2023 Office Action issued in Chinese Patent Application No. 202080055750.2.

* cited by examiner

POWER TOOL

TECHNICAL FIELD

The present disclosure relates to a power tool to which an accessory can be detachably attached.

BACKGROUND ART

There are known power tools to which an accessory is detachably attachable. For example, an auxiliary handle is detachably attachable to some power tools used for a drilling operation, so that a user can hold the power tool with both hands. Further, U.S. Pat. No. 7,628,219 discloses an auxiliary handle provided with a detection unit, which is capable of detecting various information, to determine whether the auxiliary handle is attached to the power tool via connection between the detection unit and the power tool.

SUMMARY OF INVENTION

Technical Problem

The foregoing document discloses that the connection between the detection device and the power tool may be established via a contact device or in a non-contact manner. However, further improvement is possible in efficiently determining whether an accessory such as the auxiliary handle is attached or not.

In view of this situation, it is an object of the present disclosure to provide techniques that can improve efficiency of determining whether an accessory is attached to a power tool.

Solution to Problem

One aspect of the present disclosure provides a power tool that includes an accessory and a reader. The accessory is configured to be attachable to and detachable from the power tool. The accessory includes a passive wireless tag. The reader includes an antenna and a reading part that is electrically connected to the antenna. The reading part is configured to wirelessly communicate with the wireless tag via the antenna and to read information stored in the wireless tag when the accessory is attached to the power tool.

According to the power tool of the present aspect, success of the reader in reading the information stored in the wireless tag implies that the accessory is in an attached state with respect to the power tool and failure of the reader in reading the information stored in the wireless tag implies that the accessory is not in the attached state with respect to the power tool. Therefore, a result of reading the information by the reader can be used, without any modification, to determine whether the accessory is attached or not. Power tools are often used in dusty environments. With this regard, the wireless tag, which is insusceptible to, e.g., dust requires no special dust-proof measures. In addition, the passive wireless tag can be powered by radio waves received from the reader of the power tool. Consequently, the accessory does not need to include a power supply. Thus, the present aspect can improve the efficiency of determining whether the accessory is attached to the power tool.

In one aspect of the present disclosure, the wireless tag and the reader may be configured to communicate with each other using a frequency within short-wave (HF) bands or within long-wave (LF) bands. Further, a communication distance between the wireless tag and the antenna may be 30 millimeters or less. The present aspect can reduce the possibility of reading information from the accessory when it is not attached to the power tool, thereby improving accuracy of determining whether the accessory is attached.

In one aspect of the present disclosure, the accessory may include a plastic portion made of plastic. The wireless tag may be covered with the plastic portion of the accessory. This aspect can reduce the influence of, e.g., metal on the wireless tag. It should be noted that the term "covered" as used in the present aspect does not require complete covering of the entirety of the wireless tag but may include partial covering thereof.

In one aspect of the present disclosure, the power tool may include a plastic portion made of plastic. The antenna may be covered with the plastic portion of the power tool. This aspect can reduce the influence of, e.g., metal on the antenna. It should be noted that the term "covered" as used in the present aspect does not require complete covering of the entirety of the antenna but may include partial covering thereof.

In one aspect of the present disclosure, the wireless tag may store identification information that is unique to the accessory. The power tool may further include a storage part that stores the identification information read by the reading part and information related to a use history of the accessory in association with each other. The present aspect enables later use of the use history of the accessory stored in the storage part.

In one aspect of the present disclosure, the power tool may further include a tool body. The accessory may be an auxiliary handle having a first threaded portion, which is threadedly engageable with the tool body. The tool body may include the antenna. The wireless tag may have an annular shape and disposed such that the wireless tag surrounds a rotational axis of the first threaded portion. In the present aspect, the first threaded portion changes its position around the rotational axis with respect to the tool body in response to screwing. Therefore, if the wireless tag is disposed at a specific position around the rotational axis, the positional relationship between the wireless tag and the antenna is likely to change significantly. With this regard, arranging the annular wireless tag such that it surrounds the rotational axis of the first threaded portion can reduce the influence on the positional relationship between the wireless tag and the antenna, and consequently, the influence on communication between the wireless tag and the antenna, even if the position of the first threaded portion around the rotational axis changes. It should be noted that the tool body in this aspect refers to, for example, a housing for accommodating a motor and/or a drive mechanism configured to drive a tool accessory.

In one aspect of the present disclosure, the tool body may include a plurality of second threaded portions, each of which is threadedly engageable with the first threaded portion. In other words, the tool body may be provided with a plurality of positions, at each of which the auxiliary handle can be attached. The present aspect allows the user to attach the auxiliary handle to an appropriate position, for example, in accordance with his/her dominant hand and a working environment.

In one aspect of the present disclosure, the auxiliary handle may include a grip that extends along the rotational axis of the first threaded portion and that is adapted to be gripped by a user. The wireless tag may be disposed between the first threaded portion and the grip.

In one aspect of the present disclosure, the auxiliary handle may include a metal shaft that extends along the rotational axis, and a plastic holder that is disposed radially outward of the shaft. The first threaded portion may be provided at one end portion of the shaft. The wireless tag may be housed in a holder.

In one aspect of the present disclosure, the holder may include a tubular inner peripheral wall that is fitted around the shaft, and a tubular outer peripheral wall that is disposed radially outward of the inner peripheral wall apart from the inner peripheral wall. The wireless tag may be disposed between the inner peripheral wall and the outer peripheral wall.

BRIEF DESCRIPTION OF DRAWINGS

FIG. 3 is a plan view of a wireless tag.

FIG. 4 is a block diagram illustrating the electrical configuration of the grinder.

DESCRIPTION OF EMBODIMENTS

Embodiments will be described below with reference to the drawings. In the following embodiments, a hand-held electric disk grinder 1 (hereinafter simply referred to as a grinder 1) is described as an example of a power tool.

Figure 1:
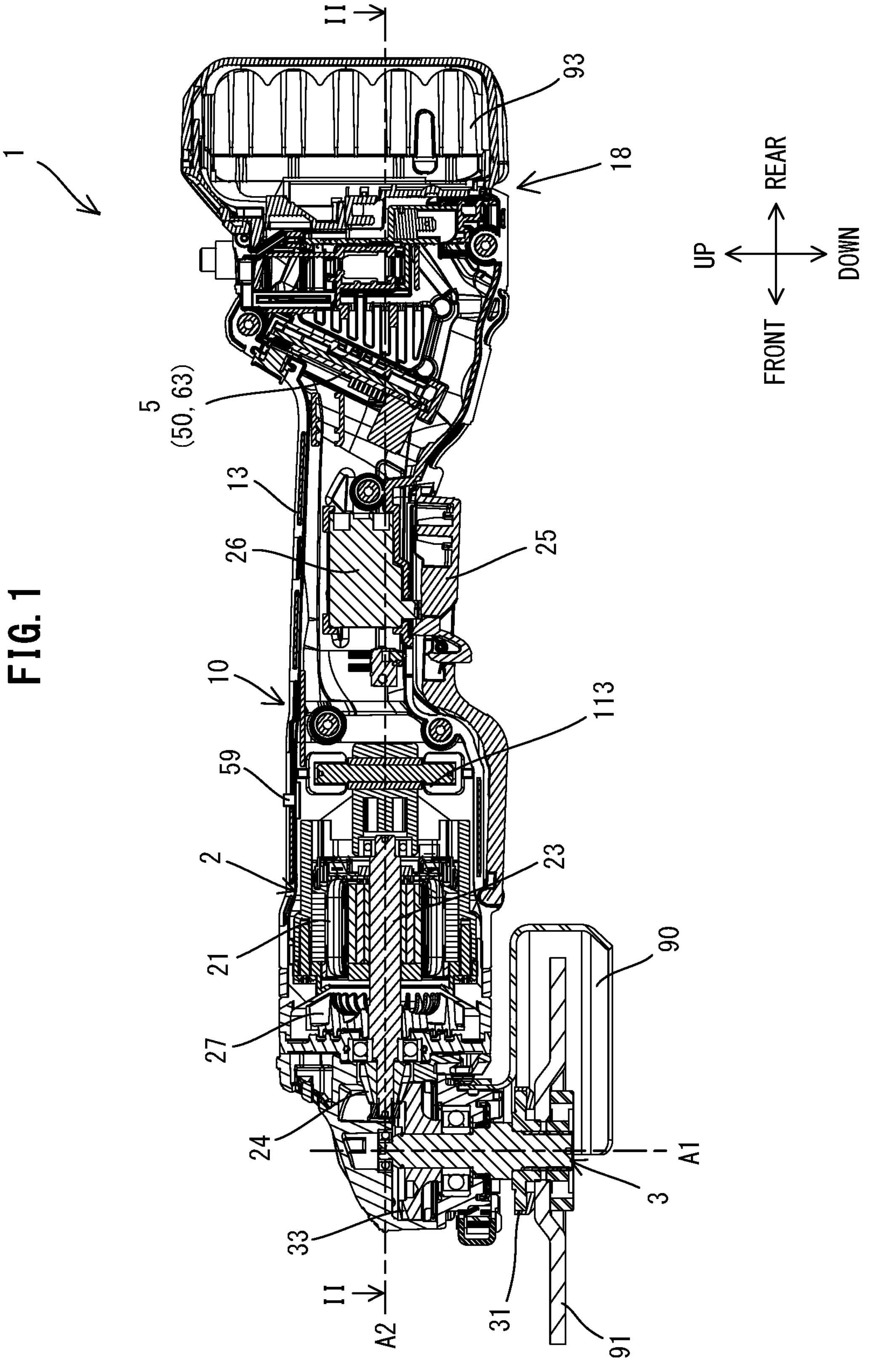
FIG. 1 is a sectional view of a grinder.

First, a general structure of the grinder 1 is described. As shown in FIG. 1, an outer shell of the grinder 1 is formed by a housing 10. The housing 10 is formed as an elongated hollow body as a whole.

One end portion of the housing 10 in its longitudinal direction accommodates a spindle 3 for rotationally driving a tool accessory 91. The spindle 3 is arranged such that its rotational axis A1 extends in a direction that intersects (more specifically, that is perpendicular to) a longitudinal axis of the housing 10. One end portion of the spindle 3 protrudes from the housing 10 to the outside and is configured as a tool mounting portion 31, on which the tool accessory 91 can be removably mounted. On the other end portion of the housing 10 in its longitudinal direction, a rechargeable battery 93 is removably mounted. A substantially central portion of the housing 10 in its longitudinal direction has a diameter that is smaller than the other portions, and constitutes a grip 13 adapted to be gripped by a user. The grip 13 is provided with a trigger 25, which can be depressed in response to external manipulation.

Figure 2:
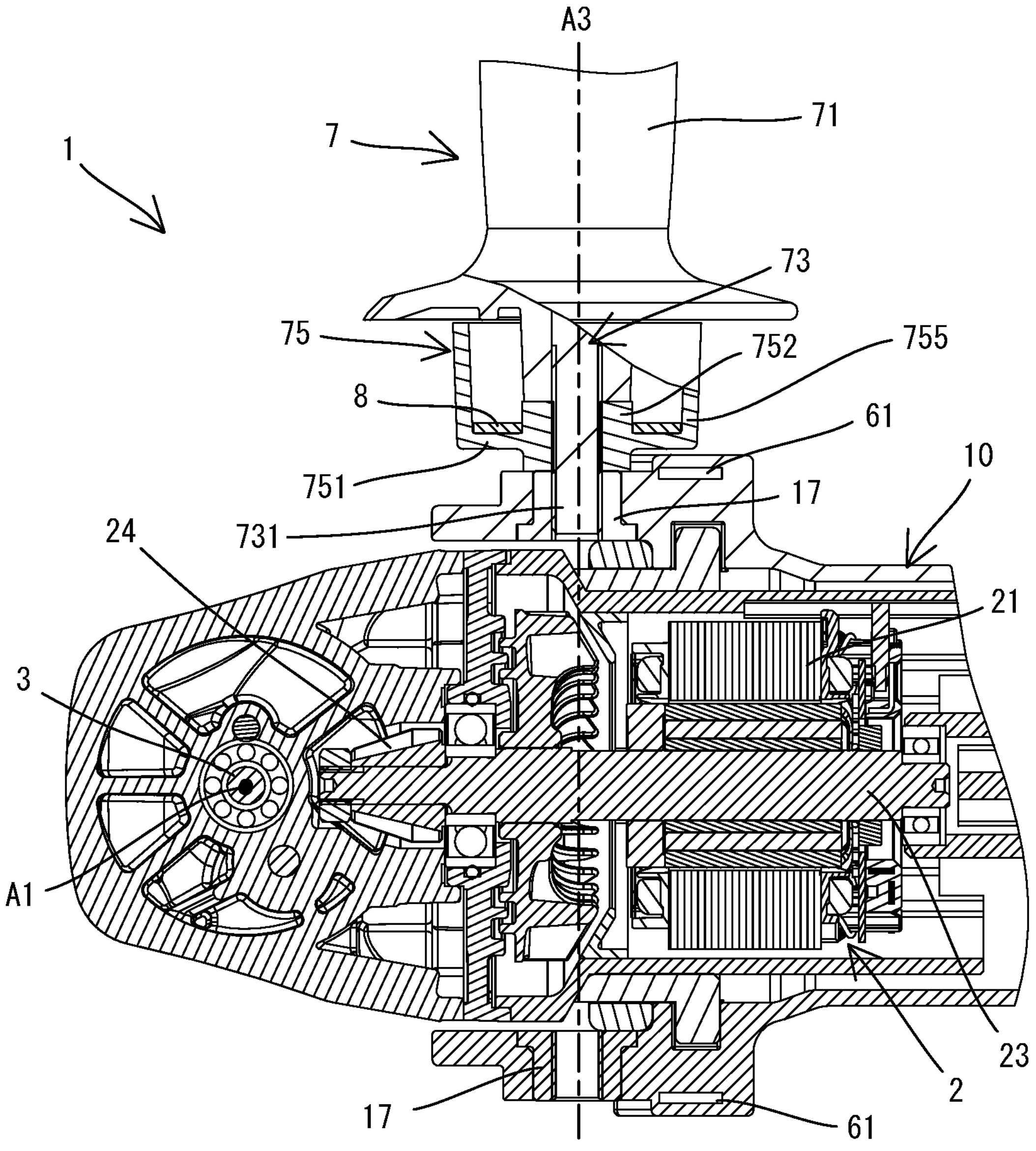
FIG. 2 is a partial sectional view taken along line II-II of FIG. 1.

As shown in FIG. 2, an auxiliary handle 7 is detachably attached to the housing 10. The auxiliary handle 7 enables the user to hold the grinder 1 with both hands, thereby assisting the user to increase his/her holding force against reaction torque, which is generated in the housing 10 in a processing operation. The auxiliary handle 7 protrudes from the housing 10 in a direction that intersects the longitudinal axis of the housing 10.

The grinder 1 is configured to rotationally drive the disk-shaped tool accessory 91 mounted on the tool mounting portion 31. Available tool accessories that are mountable on the grinder 1 include, e.g., a grindstone, a rubber pad, a brush, and a blade, etc. The user selects an appropriate tool accessory 91 according to an intended processing operation and mount it on the tool mounting portion 31. When the user grips the grip 13 and the auxiliary handle 7 with both hands and presses the trigger 25, the tool accessory 91 is rotationally driven to perform the processing operation, such as grinding, polishing, and cutting on a workpiece.

The physical configuration of the grinder 1 is now described in detail. In the following description, for the sake of convenience, an extension direction of the rotational axis A1 of the spindle 3 (also referred to as a rotational-axis-A1 direction) is defined as an up-down direction of the grinder 1. In the up-down direction, the side on which the tool mounting portion 31 protrudes from the housing 10 is defined as a lower side, and the opposite side is defined as an upper side. The direction that is perpendicular to the rotational axis A1 of the spindle 3 and that corresponds to the longitudinal axis of the housing 10 is defined as a front-rear direction of the grinder 1. In the front-rear direction, the side on which the one end portion of the housing 10 accommodating the spindle 3 is located is defined as a front side, and the opposite side as a rear side. The direction that is perpendicular to the up-down direction and the front-rear direction is defined as a left-right direction.

First, the components disposed within the housing 10 is described. As shown in FIG. 1, the housing 10 houses the spindle 3, a motor 2, a switch 26, and a controller 5 in this order from the front end toward the rear end. These components are described now in this order.

As described above, the spindle 3 is disposed in the front end portion of the housing 10 and extends in the up-down direction. The spindle 3 is supported by two bearings held by the housing 10 to be rotatable about the rotational axis A1. A large bevel gear 33 is fixed on an upper end portion of the spindle 3. The tool mounting portion 31 provided at a lower end portion of the spindle 3 includes two flanges. The tool accessory 91 is clamped by these flanges in the up-down direction, so that it is fixed to the spindle 3. A wheel cover 90 is detachably attached to a lower end of the front end portion of the housing 10 (not shown in FIG. 2). The wheel cover 90 is a member for suppressing scattering of fragments and dust of a workpiece generated in the processing operation and for protecting the user from the tool accessory 91. Since the structures of the tool mounting portion 31 and the wheel cover 90 are well known, detailed description thereof is omitted here.

The motor 2 is arranged rearward of the spindle 3. This embodiment employs a DC brushless motor as the motor 2. The motor 2 includes a motor body portion 21, which includes a stator and a rotor, and a motor shaft 23, which extends from the rotor. The motor shaft 23 is supported by two bearings held in the housing 10 to be rotatable about a rotational axis A2. The rotational axis A2 of the motor shaft 23 extends in the front-rear direction (in the longitudinal direction of the housing 10) perpendicular to the rotational axis A1 of the spindle 3. A fan 27 for cooling the motor 2 is fixed around a portion of the motor shaft 23 between the motor body portion 21 and the front bearing.

A small bevel gear 24 is fixed around the front end portion of the motor shaft 23, and is engaged with the large bevel gear 33 of the spindle 3. The small bevel gear 24 and the large bevel gear 33 constitute a speed reduction mechanism. The rotation of the motor shaft 23 is transmitted to the spindle 3 after reduction in the rotational speed by the small bevel gear 24 and the large bevel gear 33. Thus, the spindle 3 rotates around the rotational axis A1 along with driving of the motor 2, thereby rotating the tool accessory 91 fixed to the tool mounting portion 31 together with the spindle 3.

The switch 26 is housed in the grip 13. The switch 26 is a switch for activating the motor 2 and is disposed above the trigger 25. The switch 26 is normally maintained in an OFF state, and is switched to an ON state (a state in which an instruction to activate the motor 2 has been received) in response to manual depressing operation on the trigger 25.

The switch 26 is connected to the controller 5 by wires (not shown). The switch 26 outputs a specific signal (ON signal) to the controller 5 in response to being switched to the ON state.

The controller 5 is housed in a rear end portion of the housing 10 (a portion extending rearward of the grip 13). In this embodiment, the controller 5 includes a main control part 50, a reader control part 63, a board on which the main control part 50 and the reader control part 63 are mounted, and a case that houses the board. The main control part 50 is a control part for controlling the operation of the grinder 1. In the present embodiment, the main control part 50 is constituted by a microcomputer including a CPU, a ROM, and a RAM, etc. The reader control part 63 is a control part for wirelessly communicating with a wireless tag 8, which will be described later. The reader control part 63 includes a microcomputer, which includes a CPU, a ROM, and a RAM. The reader control part 63 also includes a transceiver circuit, and a signal processing circuit, etc.

The rear end portion of the housing 10 has a battery mounting portion 18. The battery 93, which serves as a power source, can be mounted on and removed from the battery mounting portion 18. Although not explained in detail, the battery mounting portion 18 has well-known structures, including guide rails that are slidably engageable with the battery 93 and terminals that are electrically connectable to terminals of the battery 93.

Next, the auxiliary handle 7 and the mounting structure of the auxiliary handle 7 to the housing 10 are described.

As shown (only partly) in FIG. 2, the auxiliary handle 7 includes a grip 71 and a shaft 73. The grip 71 is an elongate plastic portion to be gripped by the user. The shaft 73 is a metal rod member. The shaft 73 extends along a longitudinal axis of the grip 71 and protrudes from one axial end of the grip 71. The outer peripheral surface of the protruding end portion of the shaft 73 is threaded to form a thread groove. Hereinafter, this end portion of the shaft 73 is referred to as a threaded portion 731. The auxiliary handle 7 is attached to the housing 10 via the threaded portion 731. Specifically, the housing 10 is provided with metal nuts 17. The nuts 17 each have a female thread that corresponds to the threaded portion 731. In the present embodiment, two such nuts 17 are disposed at two positions in a left wall and a right wall of the front end portion of the housing 10. The left wall and the right wall of the housing 10 are made of plastic. In actual use, the user can attach the auxiliary handle 7 to the housing 10 by screwing the threaded portion 731 into either one of the nuts 17, depending on his/her dominant hand and a working environment, for example. The auxiliary handle 7, in an attached state with respect to the housing 10, extends in a direction that intersects (particularly, in a direction perpendicular to) the rotational axis A1 of the spindle 3.

Further, in the present embodiment, the auxiliary handle 7 and the housing 10 are provided with a structure for detecting the attached state of the auxiliary handle 7. Specifically, the auxiliary handle 7 includes a wireless tag 8. The housing 10 includes a reader 6 (see FIG. 4), which is configured to wirelessly communicate with the wireless tag 8 and to read information from the wireless tag 8 in a non-contact manner. It should be noted that the wireless tag 8 employed in this embodiment is a passive wireless tag, which has no power source incorporated therein, and which is configured to be powered by radio waves (carrier waves) from the reader 6, and to communicate with the reader 6 by reflecting the radio waves.

The wireless tag 8 is now described. As shown in FIGS. 2 and 3, the wireless tag 8 includes an antenna 81, an integrated circuit (IC) chip 83, and a cover member 85. The antenna 81 is arranged in an annular shape. The IC chip 83 is connected to the antenna 81. The IC chip 83 has a general structure employed in known passive wireless tags. Specifically, the IC chip 83 includes a transceiver circuit, a control circuit, and a memory, etc. The memory stores identification information that is unique to the wireless tag 8. Upon receiving radio waves from the reader 6, the IC chip 83 converts the identification information into a signal and transmit the signal via the antenna 81. The cover member 85 has an annular disk shape and covers the antenna 81 and the IC chip 83.

The wireless tag 8 is housed in a plastic holder 75, which is attached to the auxiliary handle 7. The holder 75 is fitted around an outer peripheral portion of the shaft 73, and disposed between the threaded portion 731 and the grip 71. The holder 75 has a bottomed cylindrical shape, and includes a circular bottom wall 751 and a peripheral wall 755 surrounding an outer edge of the bottom wall 751. The bottom wall 751 has a through-hole, through which the shaft 73 is inserted. A cylindrical boss 752 is provided around the through-hole. An annular space is defined between the boss 752 and the peripheral wall 755 in the radial direction. The wireless tag 8 is fitted in this space and held in a state covered by the holder 75. Thus, the wireless tag 8 is disposed such that the wireless tag 8 surrounds (encircles) the rotational axis A3 of the threaded portion 731 (the axis of the shaft 73) while isolated from the shaft 73 by the boss 752. In this embodiment, the thickness of the wall of the boss 752 of the holder 75 is approximately 5 millimeters (mm). The thickness of each of the bottom wall 751 and the peripheral wall 755 is approximately 2 mm.

The reader 6 is now described. As shown in FIGS. 1 and 2, the reader 6 includes an antenna 61 and the reader control part 63. The reader control part 63 is connected to the antenna 61 by wires (not shown) and can wirelessly communicate with the wireless tag 8 via the antenna 61 and to read information stored in the wireless tag 8.

In this embodiment, two antennas 61 are provided. The two antennas 61 are respectively embedded, in the vicinity of the nuts 17, in the left side wall and the right side wall of the front end portion of the housing 10. Each antenna 61 is completely covered with a portion of the housing 10 that is made of plastic. Each antenna 61 is embedded at a position relatively close to the outer surface of the housing 10 (more specifically, at a position approximately 2 mm from the outer surface). Each antenna 61 is disposed at a position where the antenna 61 overlaps a portion of the wireless tag 8 (antenna 81) of the auxiliary handle 7 attached to the housing 10 when viewed in the extension direction of the rotational axis A3. In other words, it is possible to draw a straight line that is parallel to the rotational axis A3 and that passes through a point in the antenna 61 and a point in the wireless tag 8 (antenna 81). In the present embodiment, owing to this arrangement, when the threaded portion 731 is screwed into the nut 17 to the maximum (when the auxiliary handle 7 is in a fully attached state), the shortest distance between the antenna 61 and the antenna 81 of the wireless tag 8 (the distance in the extension direction of the rotational axis A3) is approximately 5 mm.

As described above, the reader control part 63 is mounted on the board of the controller 5 and includes the microcomputer, the transceiver circuit, and the signal processing circuit, etc. The transceiver circuit is a circuit for communicating with the wireless tag 8 via the antenna 61. The signal processing circuit is a circuit for processing a signal received from the wireless tag 8. In this embodiment, the microcomputer controls the overall operation of the reader 6.

The wireless tag 8 and the reader 6 of this embodiment are configured to communicate with each other using a predetermined frequency (13.56 megahertz (MHz)) within short-wave (HF) bands. The communication (communicative) distance between the wireless tag 8 and the antenna 61 of the reader 6 is set to approximately 10 mm. In the short-wave (HF) bands, radio waves spread in a semicircular shape from the antenna 61. Therefore, when the wireless tag 8 (antenna 81) is within a semicircular communication range having a radius of approximately 10 mm around the antenna 61, the reader 6 can read the identification information from the wireless tag 8.

As described above, in a case where the auxiliary handle 7 is in the fully attached state with respect to the housing 10, the shortest distance between the antenna 61 and the wireless tag 8 is approximately 5 mm. Therefore, when the auxiliary handle 7 is attached to the housing 10 (including a case where the screwing is slightly loose), the reader 6 can reliably read the identification information from the wireless tag 8. On the contrary, in a case where the auxiliary handle 7 has been detached from the housing 10, the wireless tag 8 is basically outside of the communication range of the antenna 61. Thus, whether the reader 6 can read the identification information from the wireless tag 8 depends substantially on whether the auxiliary handle 7 is attached to the housing 10.

The electrical configuration of the grinder 1 is now described. As shown in FIG. 4, the grinder 1 includes the main control part 50 that controls the operation of the grinder 1. As described above, the main control part 50 comprises the microcomputer including the CPU, the ROM, and the RAM, etc. The main control part 50 is electrically connected to a driving circuit 51, a Hall sensor 53, the switch 26, a memory 57, the reader control part 63, and an LED 59.

The driving circuit 51 is a circuit for driving the motor 2 and includes a three-phase bridge circuit having six semiconductor switching elements. The Hall sensor 53 includes three Hall elements that correspond to the respective phases of the motor 2, and outputs a signal indicating the rotational position of the rotor to the main control part 50. The main control part 50 controls the operation of the switching elements of the driving circuit 51 according to the signal from the Hall sensor 53. As described above, when the switch is switched to the ON state in response to the depressing manipulation on the trigger 25, the switch 26 outputs an ON signal to the main control part 50. The memory 57 is a storage device that stores information. The memory 57 in this embodiment is a nonvolatile memory. The reader control part 63 wirelessly communicates with the wireless tag 8 via the antenna 61 according to a control signal from the main control part 50. The reader control part 63 outputs a signal indicating the identification information received from the wireless tag 8 (this signal is hereinafter referred to as an identification signal) to the main control part 50. The LED 59 is provided on an upper wall of the housing 10 (see FIG. 1). The main control part 50 controls lighting of the LED 59.

The operational control for the grinder 1 by the main control part 50 (more specifically, the CPU) is now described.

In this embodiment, the main control part 50 is configured to control the driving of the motor 2 based on the ON signal from the switch 26 and the identification signal from the reader control part 63 of the reader 6. More specifically, upon recognizing the ON signal outputted from the switch 26 in response to the depressing manipulation of the trigger 25, the main control part 50 first causes the reader control part 63 to send radio waves from the antenna 61. Then, the main control part 50 starts driving of the motor 2 in a case where the reader control part 63 receives a signal from the wireless tag 8 in response and thus outputs an identification signal to the main control part 50 (i.e., in a case where the auxiliary handle 7 is in the attached state). In this embodiment, the main control part 50 drives the motor 2 at a preset rotational speed. However, the main control part 50 may drive the motor 2 at a rotational speed that is set according to an operation amount (a depressed amount) of the trigger 25. Alternatively, the main control part 50 may drive the motor 2 at a rotational speed that is set in response to external manipulation by the user performed on a speed setting dial. The spindle 3 is rotationally driven in response to the driving of the motor 2 and thus the tool accessory 91 fixed to the tool mounting portion 31 performs the processing operation on the workpiece. When the switch 26 is switched to the OFF state and stops the output of the ON signal, the main control part 50 electrically brakes the motor 2 to swiftly stop the driving of the motor 2.

In a case where the reader 6 receives no signal from the wireless tag 8 and outputs no identification signal to the main control part 50 after the switch 26 is switched to the ON state (i.e., in a case where the auxiliary handle 7 is not in the attached state), the main control part 50 controls the driving of the motor 2 in a manner different from that when the auxiliary handle 7 is in the attached state. This is due to the following reasons.

In a rotary tool such as the grinder 1, if the tool accessory 91 is locked during the rotational driving of the tool accessory 91, an excessive reaction torque may act on the housing 10, which causes the housing 10 to excessively rotate around the rotational axis A1 (such a state is also called a kickback state). When the auxiliary handle 7 is not attached, the user is holding the grinder 1 with only one of his/her hands. Therefore, the holding force against the reaction torque in this situation is weaker than that of the case where the auxiliary handle 7 is attached and the user holds the grinder 1 with both of his/her hands. Therefore, in a case where the auxiliary handle 7 is not attached, the main control part 50 performs control for suppressing or preventing rapid rotation of the housing 10, as compared with a case where the auxiliary handle 7 is attached. Specifically, when the auxiliary handle 7 is not attached, the main control part 50 drives the motor 2 at a speed that is lower than when the auxiliary handle 7 is attached. Alternatively, the main control part 50 does not drive the motor 2 (does not supply electrical power to the motor 2).

Further, the main control part 50 lights the LED 59. Thus, the user can easily recognize that the motor 2 is being driven at low speed (or the motor 2 is not being driven) because the auxiliary handle 7 is not attached. The user can thus attach the auxiliary handle 7 to address this situation.

In addition, the main control part 50 may store (write) the identification information of the wireless tag 8, which is specified based on the identification signal, in association with information on a use (usage) history of the auxiliary handle 7 (hereinafter referred to as use history information) into the memory 57. For example, the main control part 50 may store this information in the memory 57 after stopping the driving of the motor 2. The use history information stored in the memory 57 may include, for example, a date and time of usage (specifically, the date and time when the driving of the motor 2 is started or stopped) and a used time (specifically, a start time and a stop time of driving of the motor 2 (or a duration of driving of the motor 2)).

Any other auxiliary handle 7 may be attached to the housing 10, as long as the auxiliary handle 7 has a threaded portion 731 that is threadedly engageable with the nut 17. For example, in a case where a plurality of users share the grinder 1, each of the users may have his/her own auxiliary handle 7 and mount it on the housing 10 only in use. In such a case, if the identification information unique to each wireless tag 8, thus unique to each auxiliary handle 7, is stored in the memory 57 in association with the use history information, this information can be effectively utilized for, e.g., management of working time of the users.

For example, upon recognizing the identification signal from the reader control part 63, the main control part 50 accesses the memory 57 and reads out the used time (e.g., the start time and the stop time of driving of the motor 2) that corresponds to the identification information indicated by the identification signal. For example, in a case where the used time exceeds a predetermined threshold value and a predetermined time has not yet elapsed from the stop time of driving of the motor 2, the main control part 50 may not start driving of the motor 2 and/or may light the LED 59. Alternatively, in a case of the grinder 1 having a display part (e.g., a liquid crystal display), upon recognizing the identification signal from the reader control part 63, for example, the main control part 50 can cause the display part to display, e.g., a message in accordance with the use history information.

As described above, the grinder 1 of this embodiment includes the auxiliary handle 7 that includes the passive wireless tag 8 and that is attachable to and detachable from the housing 10, and the reader 6 that is capable of wirelessly communicating with the wireless tag 8. Success of the reader 6 (more specifically, the reader control part 63) in reading the information stored in the wireless tag 8 implies that the auxiliary handle 7 is attached to the grinder 1 (to the housing 10), and failure of the reader 6 in reading the information implies that the auxiliary handle 7 is not attached to the grinder 1. Therefore, a result of reading the information by the reader 6 (whether the reader was able to read the information) can be used, without any modification, to determine whether the auxiliary handle 7 is attached. The grinder 1 is often used in a dusty environment. With this regard, the wireless tag 8 is insusceptible to, e.g., dust, and thus requires no special dust-proof measures. In addition, the passive wireless tag 8 can be powered by radio waves received from the reader 6. Consequently, the auxiliary handle 7 does not need to include a power supply. Thus, the present embodiment can improve the efficiency of determining whether the auxiliary handle 7 is attached to the grinder 1.

Further, in this embodiment, the wireless tag 8 and the reader 6 are configured to communicate with each other at a frequency within the short-wave (HF) bands, and the communication distance between the wireless tag 8 and the antenna 61 is set to approximately 10 mm. This configuration can substantially eliminate the possibility of reading information from the wireless tag 8 when the auxiliary handle 7 is not attached to the grinder 1, thereby improving the accuracy of determining whether the auxiliary handle 7 is attached.

In this embodiment, the wireless tag 8 is covered by the holder 75 that is made of plastic. This structure can reduce the influence of the metal on the wireless tag 8. In particular, the holder 75 has the boss 752 that is interposed between the shaft 73 and the wireless tag 8. The wireless tag 8 is thus suitably isolated from the metal shaft 73 by the boss 752. The wireless tag 8 is also suitably isolated, by the bottom wall 751 and the boss 752, from the metal nut 17 provided in the housing 10. The antennas 61 of the reader 6 are each covered by the side wall of the housing 10 made of plastic. This configuration can reduce the influence of the metal on the antennas 61. In particular, since the antennas 61 are each completely covered with plastic, the antennas 61 are each suitably isolated from the metal nuts 17 respectively disposed nearby.

Further, the wireless tag 8 (in particular, antenna 81) of the present embodiment is formed in an annular shape and surrounds (encircles) the rotational axis A3 of the threaded portion 731. The antenna 61 of the reader 6 is disposed in the housing 10. The threaded portion 731 changes its position around the rotational axis A3 with respect to the housing 10 as the threaded portion 731 is screwed to the nut 17. Therefore, if the wireless tag 8 (in particular, antenna 81) is disposed at a specific position around the rotational axis A3, the positional relationship between the wireless tag 8 and the antenna 61 is likely to change significantly. With this regard, since the annular wireless tag 8 of the present embodiment surrounds the rotational axis A3, the change of the position of the threaded portion 731 around the rotational axis A3 is less likely to affect the positional relationship between the wireless tag 8 and the antenna 61, and thus communication between the wireless tag 8 and the antenna 61. Further, this embodiment facilitates assembling since attaching the wireless tag 8 to the shaft 73 via the holder 75 requires no positioning around the rotational axis A3 with respect to the shaft 73.

The correspondences between the structures illustrated in the above embodiment and the features of the present disclosure are now described. However, the components in the embodiments are merely exemplary and are not intended to limit the features of the present disclosure. The grinder 1 is an example of a "power tool". The auxiliary handle 7 is an example of an "accessory". The wireless tag 8 is an example of a "wireless tag". The reader 6, the antenna 61, and the reader control part 63 are examples of a "reader", an "antenna", and a "reading part", respectively. The holder 75 of the auxiliary handle 7 is an example of a "plastic portion of the accessory". The housing 10 (more specifically, the side wall) is an example of a "plastic portion of the power tool". The memory 57 is an example of a "storage part". The housing 10 is an example of a "tool body". The auxiliary handle 7 and the threaded portion 731 are examples of an "auxiliary handle" and a "first threaded portion", respectively. The nut 17 is an example of a "second threaded portion". The grip 71 is an example of a "grip". The shaft 73 and the holder 75 are examples of a "shaft" and a "holder", respectively. The boss 752 and the peripheral wall 755 are examples of an "inner peripheral wall" and an "outer peripheral wall", respectively.

It should be noted that the above embodiment is merely exemplary, and the power tool according to the present disclosure is not limited to the grinder 1 described above. For example, the following modifications may be made. Note that any one or more of these modifications may be employed in combination with the grinder 1 shown in the embodiment or with the claimed feature.

In the above embodiment, the grinder 1 that includes the attachable/detachable auxiliary handle 7 is exemplified as a power tool that includes an attachable/detachable accessory. However, the types of accessories and power tools are not limited to this example. For example, as described above, the wheel cover 90, which is another example of the accessory, can be attached to and detached from the grinder 1. Therefore, the wheel cover 90, instead of the auxiliary handle 7, may include a wireless tag. In addition to the grinder 1, there are other known power tools (e.g., circular saws, hammer drills, and driver drills) to which an auxiliary handle can be detachably attached as an accessory for enabling a user to hold the power tool with both hands. In addition, a dust collection attachment, which is another example of an accessory, can be detachably attached to some known power tools (e.g., hammer drills), in order to collect dust generated in a processing operation. Such power tools and attachments may each include a reader and a wireless tag, similarly to those in the above embodiments.

The configuration (e.g., size and shape), the number, and arrangement positions, etc. of the reader 6 and the wireless tag 8 can be appropriately changed according to the configuration of the power tool and the accessory. For example, the antenna 61 and the reader control part 63 of the reader 6 may be configured as one assembly (unit). Further, instead of the reader 6, it is possible to employ a reader/writer that is capable of not only reading information from a wireless tag but also writing information into the wireless tag by wireless communication with the wireless tag. The wireless tag may have a shape other than the annular shape. The antenna of the reader and the wireless tag may be provided on the outer surfaces of the power tool and the accessory, respectively.

Further, the reader (or reader/writer) and the wireless tag may be configured to communicate with each other within a frequency band other than the short-wave (HF) bands. The communication distance between the antenna of the reader and the wireless tag need not be 10 mm as described above. However, it may be preferable that the reader (or reader/writer) and the wireless tag are configured to communicate with each other using a frequency within the short-wave (HF) bands or within long-wave (LF) bands (up to 135 kilohertz (kHz)), and that the communication distance is 30 mm or less. This configuration can reduce the possibility of accidentally reading information from a wireless tag provided in an accessory not attached to the power tool, and thus can improve the accuracy of detecting whether the accessory is attached or not.

The main control part 50 in the above example is configured by the microcomputer including the CPU, etc. However, the main control part 50 may comprise at least one control circuit other than a microcomputer. The processing described above may be distributed across a plurality of control circuits. The main control part 50 may be configured by a programmable logic device (e.g., ASIC (Application Specific Integrated Circuits) and FPGA (Field Programmable Gate Array), etc.).

Further, in a case where the reader 6 fails to read information from the wireless tag 8, instead of controlling the driving of the motor 2, the main control part 50 may be configured to prevent driving of the tool accessory 91 by, for example, interrupting power transmission from the motor 2 to the tool accessory 91. In this case, for example, the main control part 50 can prevent the driving of the tool accessory 91 by actuating a clutch provided in the power transmission path.

In the above-described embodiment, in a case where the switch 26 is switched to the ON state and the reader 6 fails to read information from the wireless tag 8, the main control part 50 lights the LED 59. Alternatively, when the reader 6 fails to read information from the wireless tag 8, the main control part 50 may light the LED 59 regardless of the ON/OFF state of the switch 26. In place of the LED 59, a buzzer sound or information display may be employed as a notification, or such a notification may be omitted.

Further, in view of the nature of the present disclosure and the above-described embodiment, the following aspects are provided. At least one of the following aspects can be employed in combination with at least one of the above-described embodiment and modifications, and the claimed features.

<Aspect 1>

The shortest distance between the wireless tag and the antenna of the reader when the accessory is attached to the power tool is shorter than the communication distance.

The wireless tag typically includes an antenna and an IC chip connected to the antenna. The phrase "the shortest distance between the wireless tag and the antenna of the reader" may be rephrased as "the shortest distance between the antenna of the wireless tag and the antenna of the reader". The antenna 81 and the IC chip 83 of the wireless tag 8 of the above embodiment are examples of the "antenna of the wireless tag" and the "IC chip", respectively.

<Aspect 2>

The shortest distance between the wireless tag and the antenna of the reader when the accessory is attached to the power tool is shorter than 30 millimeters.

<Aspect 3>

The wireless tag is isolated from metal parts of the auxiliary handle and the power tool by the plastic portion of the accessory.

<Aspect 4>

The antenna is isolated from metal parts of the auxiliary handle and the power tool by the plastic portion of the power tool.

<Aspect 5>

The power tool further comprises a tool body, wherein the first threaded portion is a male screw that is threadedly engageable with a threaded hole provided in the tool body, and the antenna is disposed in the vicinity of the threaded hole and at a position facing at least a portion of the wireless tag in an extension direction of the rotational axis of the first threaded portion.

<Aspect 6>

The antenna of the reader is provided in plurality, corresponding to the plurality of second threaded portions.

<Aspect 7>

The power tool further comprises:

a motor; and a control part configured to control driving of the motor according to a result of reading the information by the reader, wherein the control part is configured not to drive the motor in a case where the reader fails to read the information, or configured to drive the motor at a lower speed in a case where the reader fails to read the information as compared with a case where the reader reads the information.

<Aspect 8>

In Aspect 7,

The power tool further comprises:

- a main switch for activating the motor, the main switch being configured to be switched to an ON state in response to an external manipulation by a user; and
- a notification part configured to notify the user of information, wherein the control part causes the notification part to notify the user of the information in a case where the main switch is in the ON state and the reader fails to read the information.

DESCRIPTION OF REFERENCE SIGNS

1: grinder, 10: housing, 13: grip, 17: nut, 18: battery mounting portion, 2: motor, 21: motor body, 23: motor shaft, 24: small bevel gear, 25: trigger, 26: switch, 27: fan, 3: spindle, 31: tool mounting portion, 33: large bevel gear, 5: controller, 50: main control part, 51: driving circuit, 53: Hall sensor, 57: memory, 59: LED, 6: reader, 61: antenna, 63: reader control part, 7: auxiliary handle, 71: grip, 73: shaft, 731: threaded portion, 75: holder, 751: bottom wall, 752: boss, 755: peripheral wall, 8: wireless tag, 81: antenna, 83: IC chip, 85: cover member, 90: wheel cover, 91: tool accessory, 93: battery, A1: rotational axis, A2: rotational axis, A3: rotational axis

The invention claimed is:

1. A power tool, comprising:

an accessory configured to be attachable to and detachable from the power tool and including a passive wireless tag; and a reader including at least one antenna and a reading part, the reading part being electrically connected to the at least one antenna and configured to wirelessly communicate with the wireless tag via the at least one antenna and to read information stored in the wireless tag when the accessory is attached to the power tool.

2. The power tool according to claim 1, wherein:

the wireless tag and the reader are configured to communicate with each other using a frequency within short-wave (HF) bands or within long-wave (LF) bands, and a communication distance between the wireless tag and the at least one antenna is 30 millimeters or less.

3. The power tool according to claim 2, wherein:

the accessory includes a plastic portion made of plastic, the wireless tag is covered with the plastic portion of the accessory, the power tool further comprises a plastic portion made of plastic, and the antenna is covered with the plastic portion of the power tool.

4. The power tool according to claim 3, further comprising:

a tool body, wherein:

the accessory is an auxiliary handle having a first threaded portion that is threadedly engageable with the tool body, the wireless tag has an annular shape and disposed such that the wireless tag surrounds a rotational axis of the first threaded portion, the tool body comprises a plurality of second threaded portions, each of the second threaded portions being threadedly engageable with the first threaded portion, the at least one antenna includes a plurality of antennas provided in the tool body, the plurality of antennas corresponding to the plurality of second threaded portions, respectively.

5. The power tool according to claim 4, wherein:

the wireless tag stores identification information that is unique to the accessory, and the power tool further comprises a storage part that stores the identification information read by the reading part and information related to a use history of the accessory in association with each other.

6. The power tool according to claim 1, wherein:

the accessory includes a plastic portion made of plastic, and the wireless tag is covered with the plastic portion of the accessory.

7. The power tool according to claim 1, further comprising:

a plastic portion made of plastic, wherein the at least one antenna is covered with the plastic portion of the power tool.

8. The power tool according to claim 1, wherein:

the wireless tag stores identification information that is unique to the accessory, and the power tool further comprises a storage part that stores the identification information read by the reading part and information related to a use history of the accessory in association with each other.

9. The power tool according to claim 1, further comprising:

a tool body, wherein:

the accessory is an auxiliary handle having a first threaded portion that is threadedly engageable with the tool body, the tool body includes the at least one antenna, and the wireless tag has an annular shape and disposed such that the wireless tag surrounds a rotational axis of the first threaded portion.

10. The power tool according to claim 9, wherein the tool body comprises a plurality of second threaded portions, each of the second threaded portions being threadedly engageable with the first threaded portion.

11. The power tool according to claim 10, wherein:

the at least one antenna includes a plurality of antennas corresponding to the plurality of second threaded portions, respectively.

12. The power tool according to claim 9, wherein:

the auxiliary handle includes a grip extending along the rotational axis of the first threaded portion and adapted to be gripped by a user, and the wireless tag is disposed between the first threaded portion and the grip.

13. The power tool according to claim 9, wherein:

the auxiliary handle includes a metal shaft extending along the rotational axis and a plastic holder disposed radially outward of the shaft, the first threaded portion is provided at one end portion of the shaft, and the wireless tag is housed in the holder.

14. The power tool according to claim 13, wherein:

the holder includes a tubular inner peripheral wall fitted around the shaft and a tubular outer peripheral wall disposed radially outward of the inner peripheral wall apart from the inner peripheral wall, and the wireless tag is disposed between the inner peripheral wall and the outer peripheral wall.

15. The power tool according to claim 1, further comprising:

a motor; and a control part configured to control driving of the motor according to a result of reading the information by the reader, wherein the control part is configured not to drive the motor in a case where the reader fails to read the information, or configured to drive the motor at a lower speed in a case where the reader fails to read the information as compared with a case where the reader reads the information.

16. The power tool according to claim 15, further comprising:

a main switch for activating the motor, the main switch being configured to be switched to an ON state in response to an external manipulation by a user; and a notification part configured to notify the user of information, wherein the control part causes the notification part to notify the user of the information in a case where the main switch is in the ON state and the reader fails to read the information.

* * * * *